United States Patent [19]

Bitar

[11] Patent Number: 5,150,060
[45] Date of Patent: Sep. 22, 1992

[54] MULTIPLEXED RADIO FREQUENCY LINEAR POSITION SENSOR SYSTEM

[75] Inventor: Ali A. Bitar, Peoria, Ill.
[73] Assignee: Caterpillar Inc., Peoria, Ill.
[21] Appl. No.: 726,068
[22] Filed: Jul. 5, 1991
[51] Int. Cl.[5] ............................................. G01R 33/32
[52] U.S. Cl. ................................. 324/635; 324/636; 324/633; 324/649; 91/1; 92/5 R; 73/116
[58] Field of Search ............... 324/629, 633, 635, 636, 324/644, 649; 91/1, 189 R; 92/5 R; 73/116

[56] References Cited

U.S. PATENT DOCUMENTS

| | | | |
|---|---|---|---|
| 4,588,953 | 5/1986 | Krage | 324/636 |
| 4,737,705 | 4/1988 | Bitar et al. | 324/633 |
| 4,901,628 | 2/1990 | Krage | 91/1 |

*Primary Examiner*—Kenneth A. Wieder
*Assistant Examiner*—Diep Do
*Attorney, Agent, or Firm*—James R. Yee

[57] ABSTRACT

An apparatus is adapted to detect the linear extensions of a plurality of hydraulic cylinders. Each hydraulic cylinder defines a variable length coaxial resonant cavity. Under the control of a controller, a transmitting section, a receiving section and multiplexers are used to multiplex RF signals to and from the cavity of each cylinder and to determine the resonant frequency of the cavity. The controller determines the linear extension of each cylinder as a function of its resonant frequency.

24 Claims, 8 Drawing Sheets

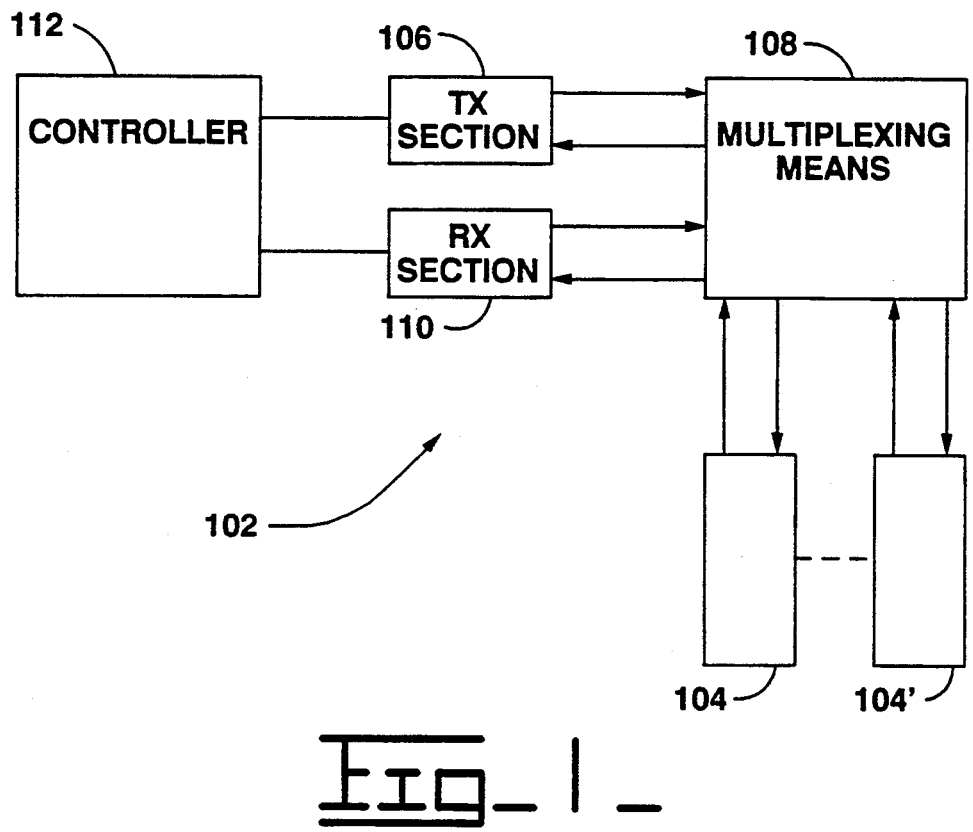
Fig_1_
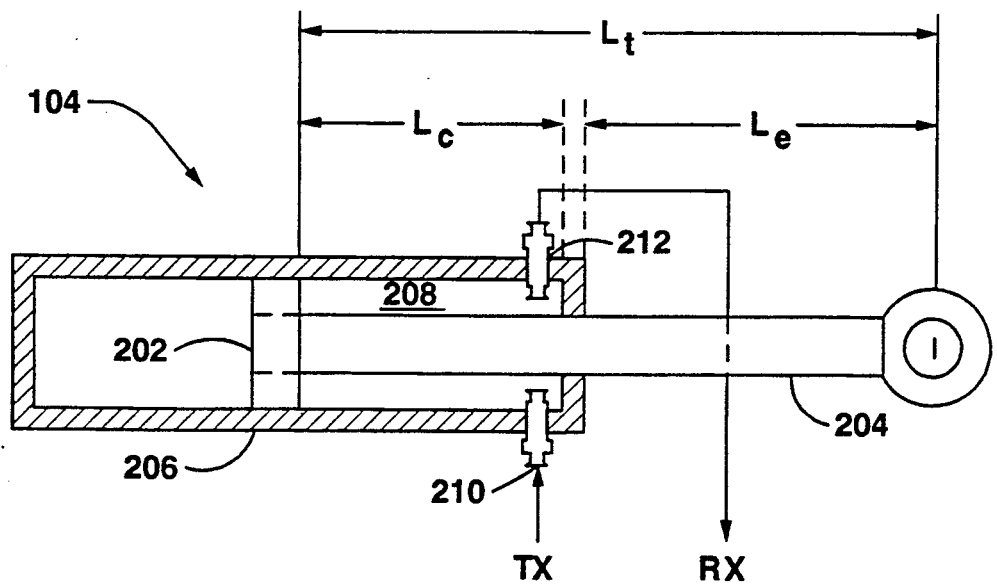
Fig_2_

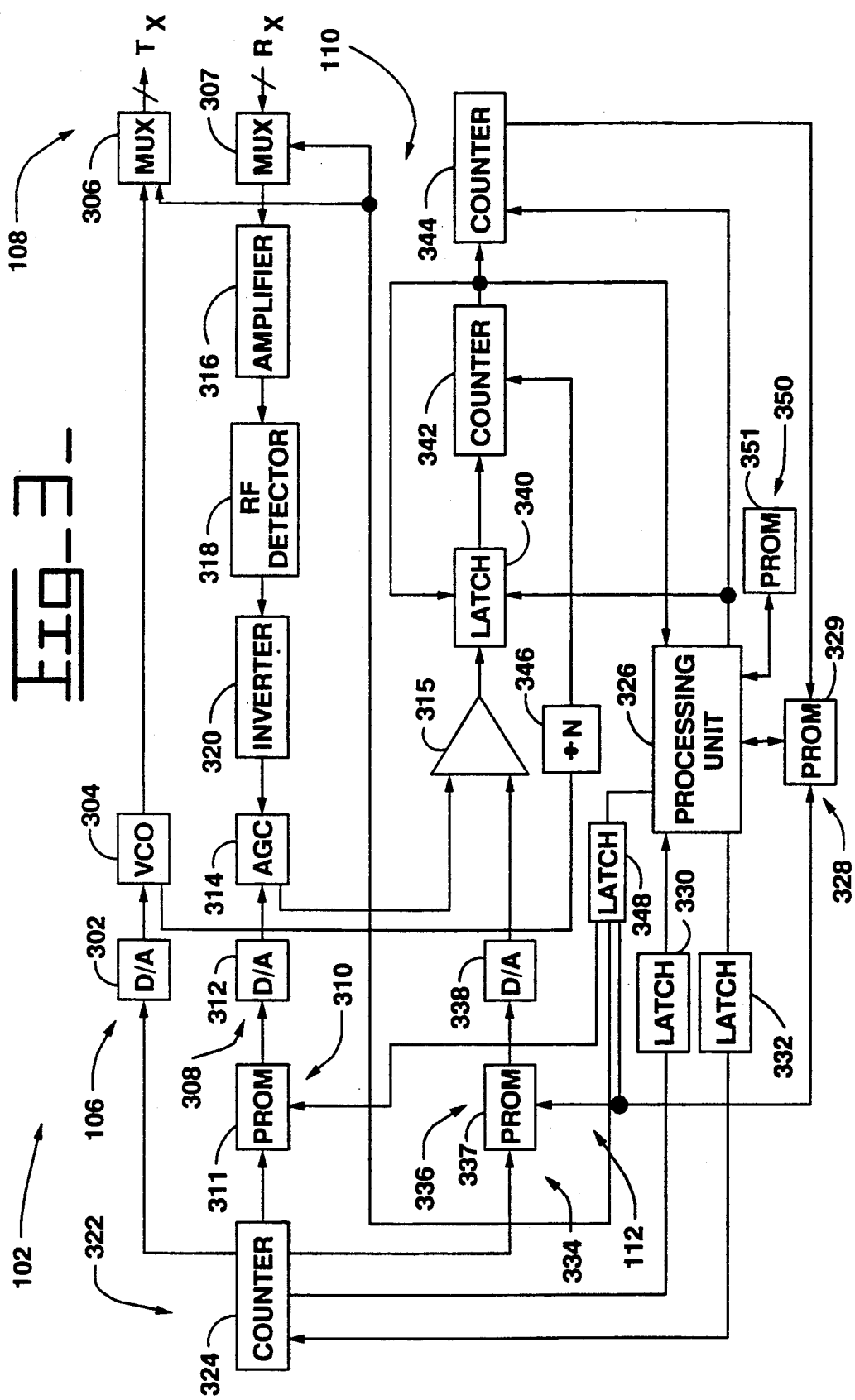

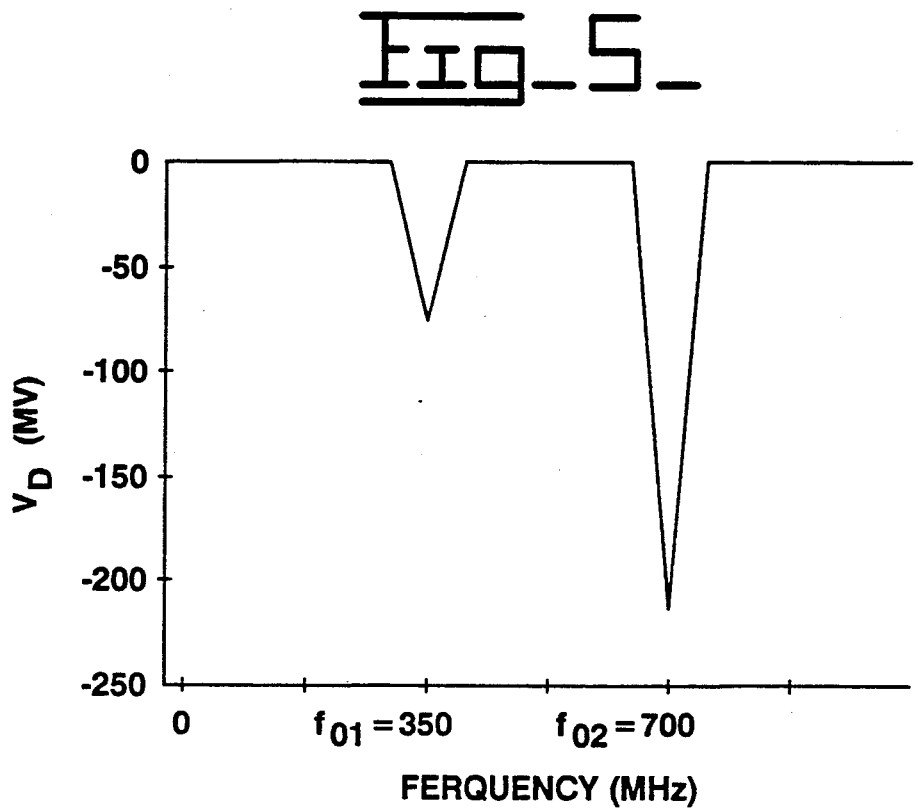
Fig_5_
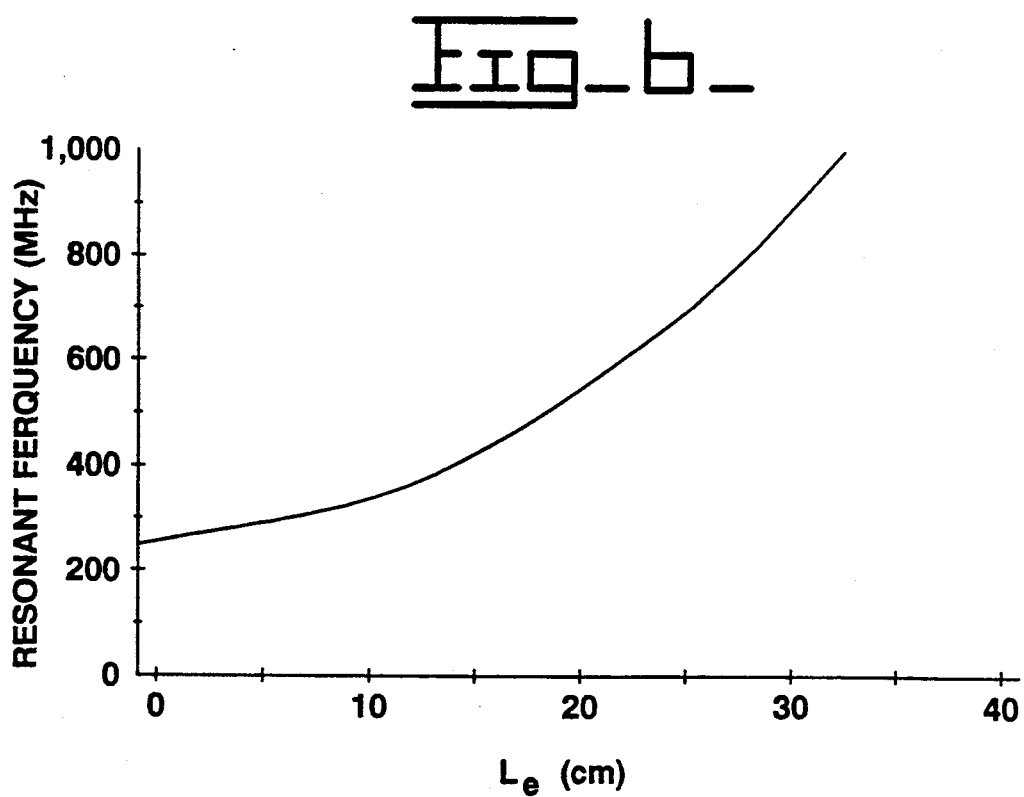
Fig_6_

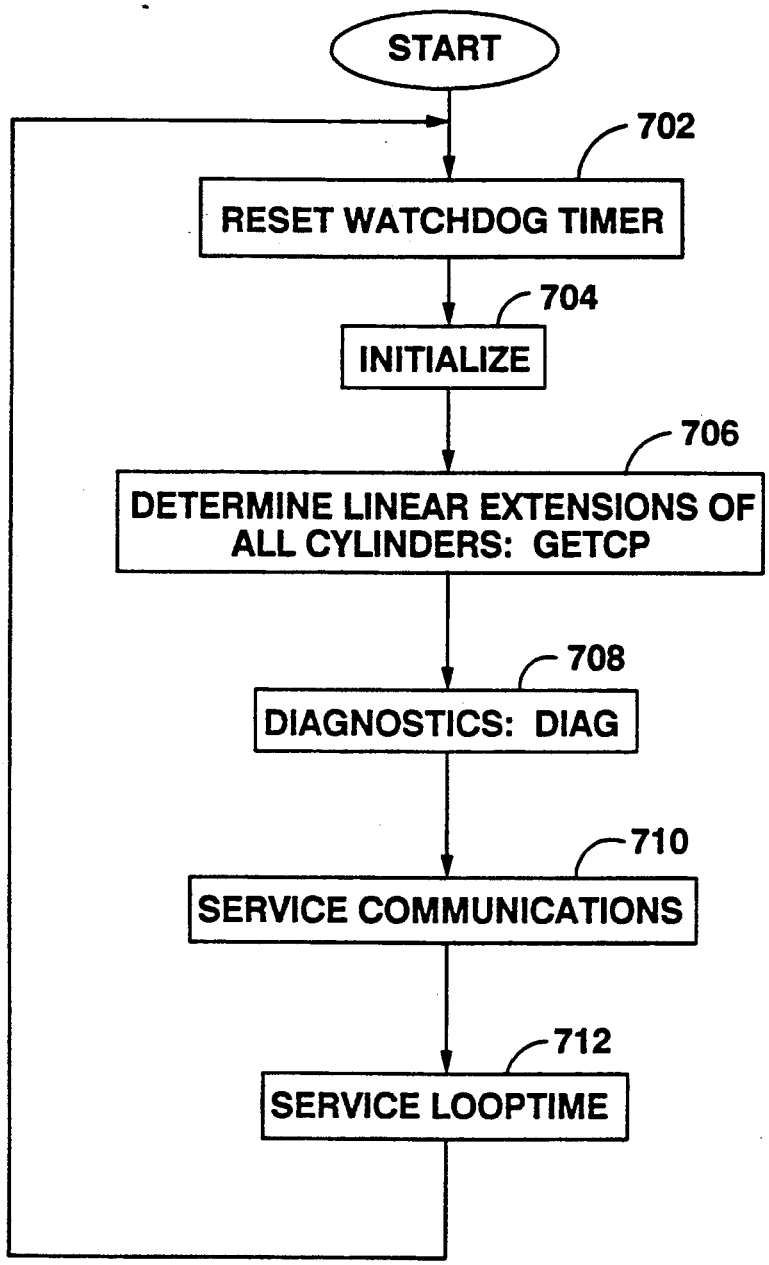
Fig_7_

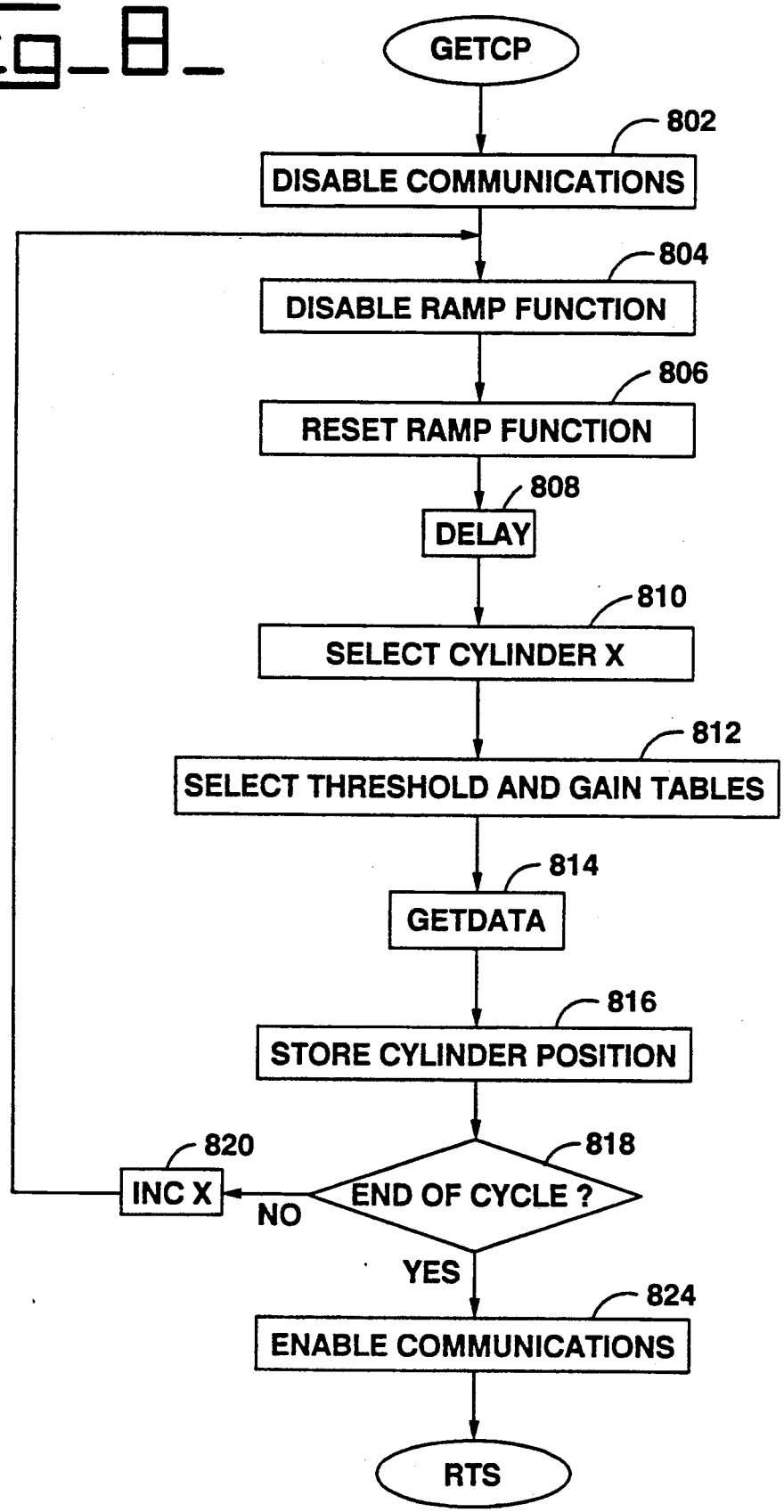
Fig_8_

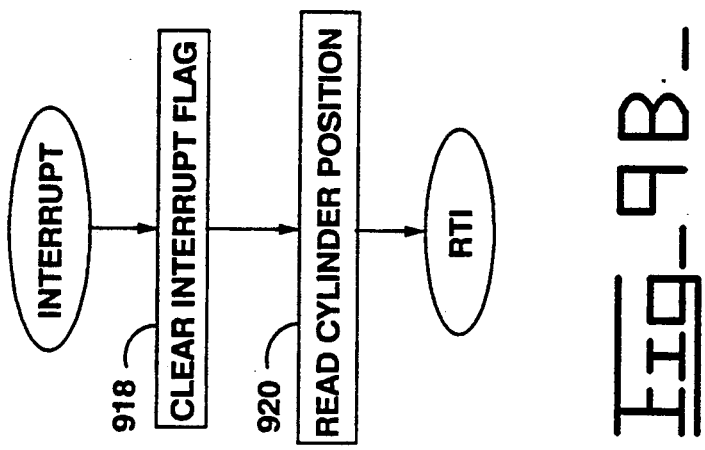
Fig_9B_
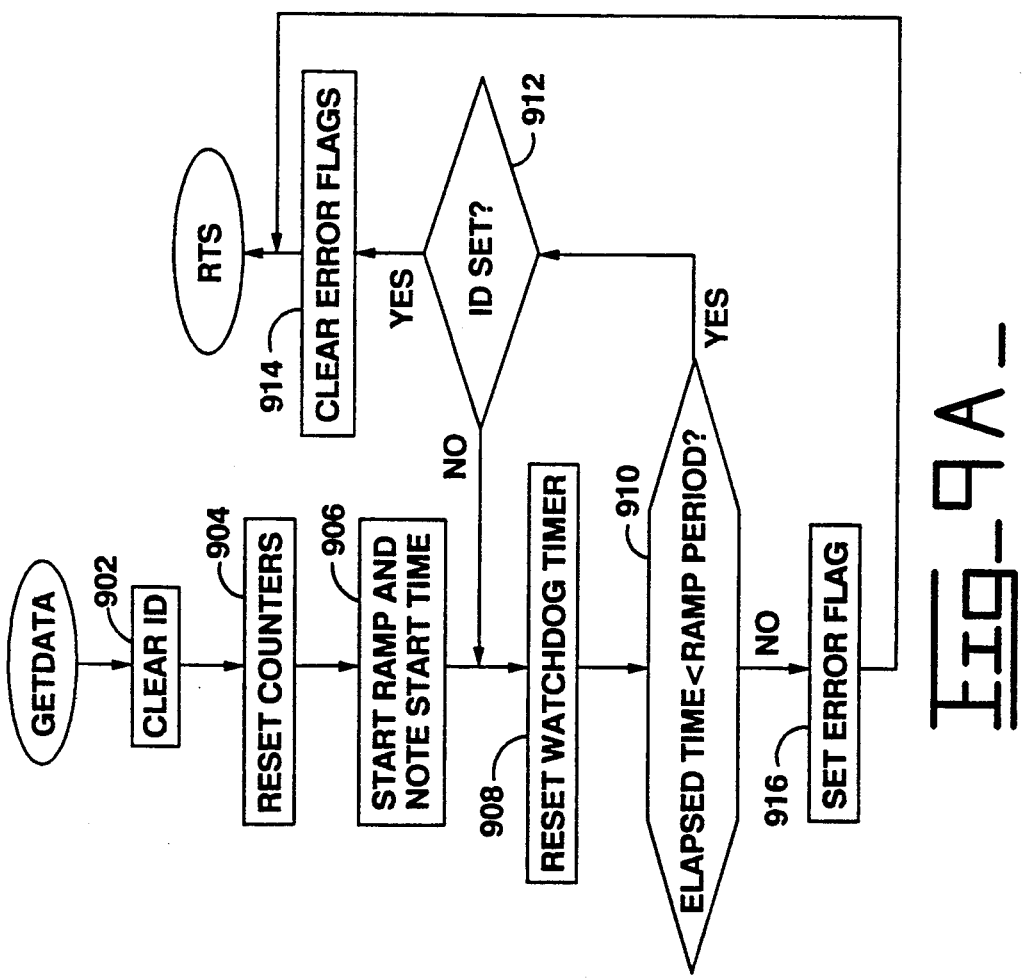
Fig_9A_

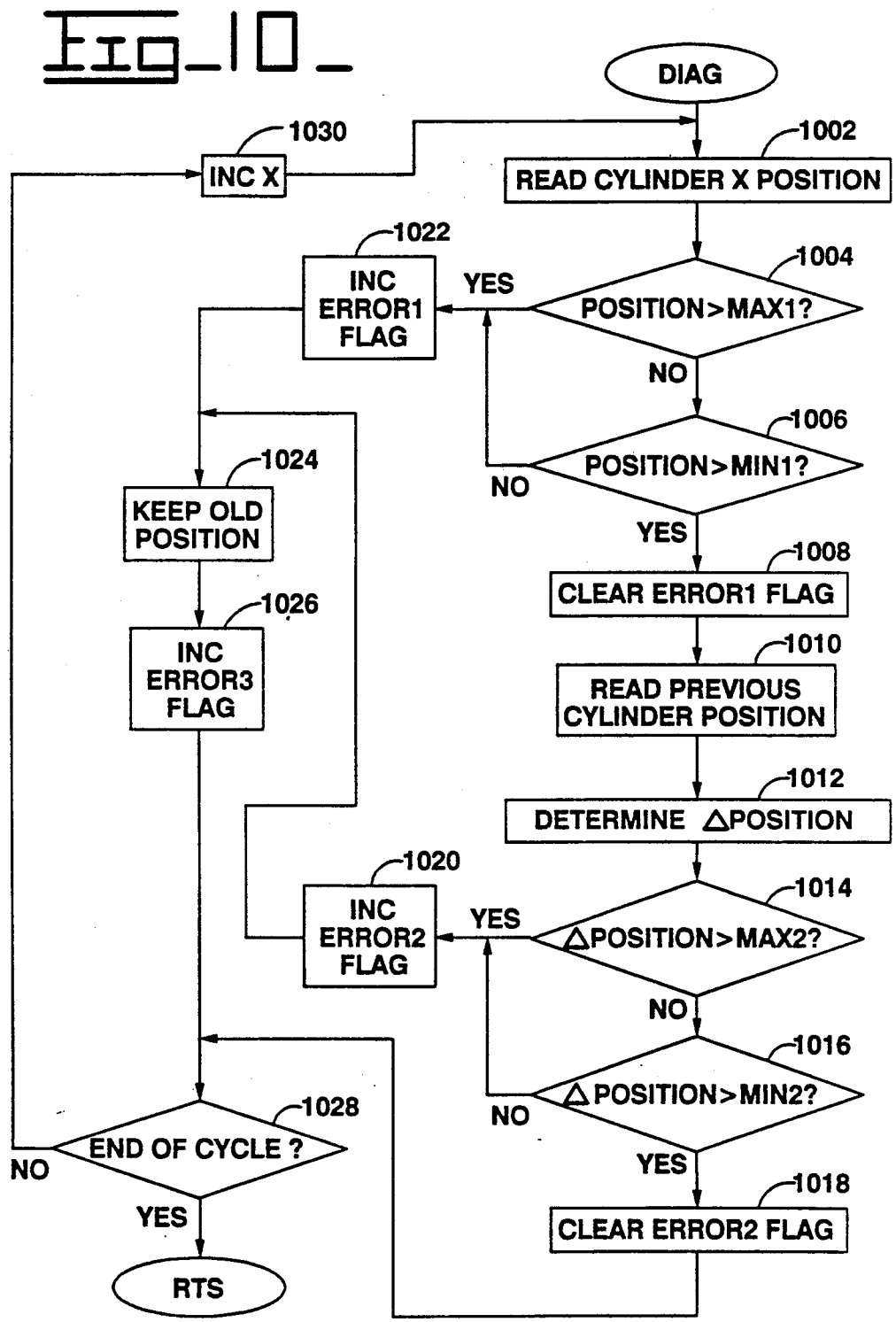

MULTIPLEXED RADIO FREQUENCY LINEAR POSITION SENSOR SYSTEM

DESCRIPTION

1. Technical Field

This invention relates generally to linear position sensors utilizing radio frequency signals and more particularly to a multiplexed radio frequency position system.

2. Background Art

In the field of hydraulic cylinders, a variety of systems have been proposed in which the displacement of the elements of the cylinder is electrically sensed and displayed or used to perform control functions. Conventional transducers have serious deficiencies owing in part to difficulties in mounting the units and the harsh environmental conditions to which they are exposed. Transducers used on hydraulic systems in the heavy equipment industry are particularly subject to damage from the severe work environment. Hydraulic cylinders are typically located in relatively unprotected areas and are typically subject to, for example, high g-forces, wide temperature variations, dust, water, debris, etc. which can result in both electrical and mechanical failure.

In one attempt to provide a sensor which is particularly suitable for the heavy equipment industry used radio frequency (RF) signals. One such system is disclosed in U.S. Pat. No. 4,737,705 issued Apr. 12, 1988 to Bitar, et al. Bitar transmits a ramping RF signal into a coaxial resonant cavity formed by the hydraulic cylinder. When the cylinder's resonant frequency is transmitted, the signal detected by a receiving antenna reaches a peak. The resonant frequency has a one to one relationship with the cylinder's extension. Thus, by determining the cylinder's resonant frequency, the cylinder's linear extension can be determined.

However, in applications where more than one sensor is being utilized, the hardware becomes expensive. Each sensor must have its own radio frequency transmitting and receiving sections. Furthermore, to determine the extension of a cylinder the frequency of the signal transmitted to the cylinder begins at a minimum and linearly ramps until a maximum is reached or the extension is determined. Thus, valuable time is wasted while the frequency of the RF signal increases toward the resonant frequency, especially at the longer extensions (higher frequencies).

The present invention is directed at overcoming one or more of the problems as set forth above.

DISCLOSURE OF THE INVENTION

In one aspect of the present invention an apparatus for detecting the linear extensions of a plurality of hydraulic cylinders is provided. Each hydraulic cylinder includes a piston, a piston rod, and a housing. The piston, piston rod, and housing form a variable length coaxial resonant cavity. The linear extension of each cylinder is defined by the position of each piston and piston rod relative to the corresponding housing. The apparatus includes a transmitting section for generating an RF signal having a predetermined frequency varying between preselected minimum and maximum values. A multiplexer selectively delivers the RF signal into the coaxial resonant cavity of one of the hydraulic cylinders and receives a first electromagnetic wave signal from within the coaxial resonant cavity. A receiving section compares the magnitude of the first electromagnetic wave signal to a first predetermined threshold value and responsively produces a first resonant signal. A controller determines the linear extension of the hydraulic cylinder as a function of the resonant signal and the frequency of the transmitted RF signal.

In a second aspect of the present invention a method for detecting the linear extensions of a plurality of hydraulic cylinders is provided. Each hydraulic cylinder includes a piston, a piston rod, and a housing. The piston, piston rod, and housing form a variable length coaxial resonant cavity. The linear extension of each cylinder is defined by the position of each piston and piston rod relative to the corresponding housing. The method includes the steps of producing a cylinder signal indicative of a desired cylinder position and generating an RF signal having a predetermined frequency varying between preselected minimum and maximum values. The generated RF signal is delivered into the coaxial cavity of one of the hydraulic cylinders. Electromagnetic wave signals are received from within the coaxial cavity and the linear position of the hydraulic cylinder is determined as a function of the electromagnetic wave signals.

BRIEF DESCRIPTION OF THE DRAWINGS

FIG. 1 illustrates a block diagram of a multiplexed radio frequency linear position sensor system, according to an embodiment of the present invention;

FIG. 2 illustrates a stylized representation of a hydraulic cylinder;

FIG. 3 illustrates an electrical schematic of the transmitting and receiving sections and the controller of the present invention;

FIG. 5 illustrates a graphical representation of the detected RF signal versus the frequency of the input RF signal;

FIG. 6 illustrates a graphical representation of the displacement of the piston rod versus the frequency of the input RF signal;

FIG. 7 is a flow diagram of the main control loop of an embodiment of the present invention;

FIG. 8 is a flow diagram of the GETCP subroutine as called by the main control loop of FIG. 7;

FIG. 9A is a flow diagram of the GETDATA subroutine as called by the subroutine GETCP of FIG. 8, according to one embodiment of the present invention;

FIG. 9B is a flow diagram if an interrupt routine, according to an embodiment of the present invention; and FIG. 10 is a flow diagram of the DIAG subroutine as called by the main control loop of FIG. 7.

BEST MODE FOR CARRYING OUT THE INVENTION

Figure 4:
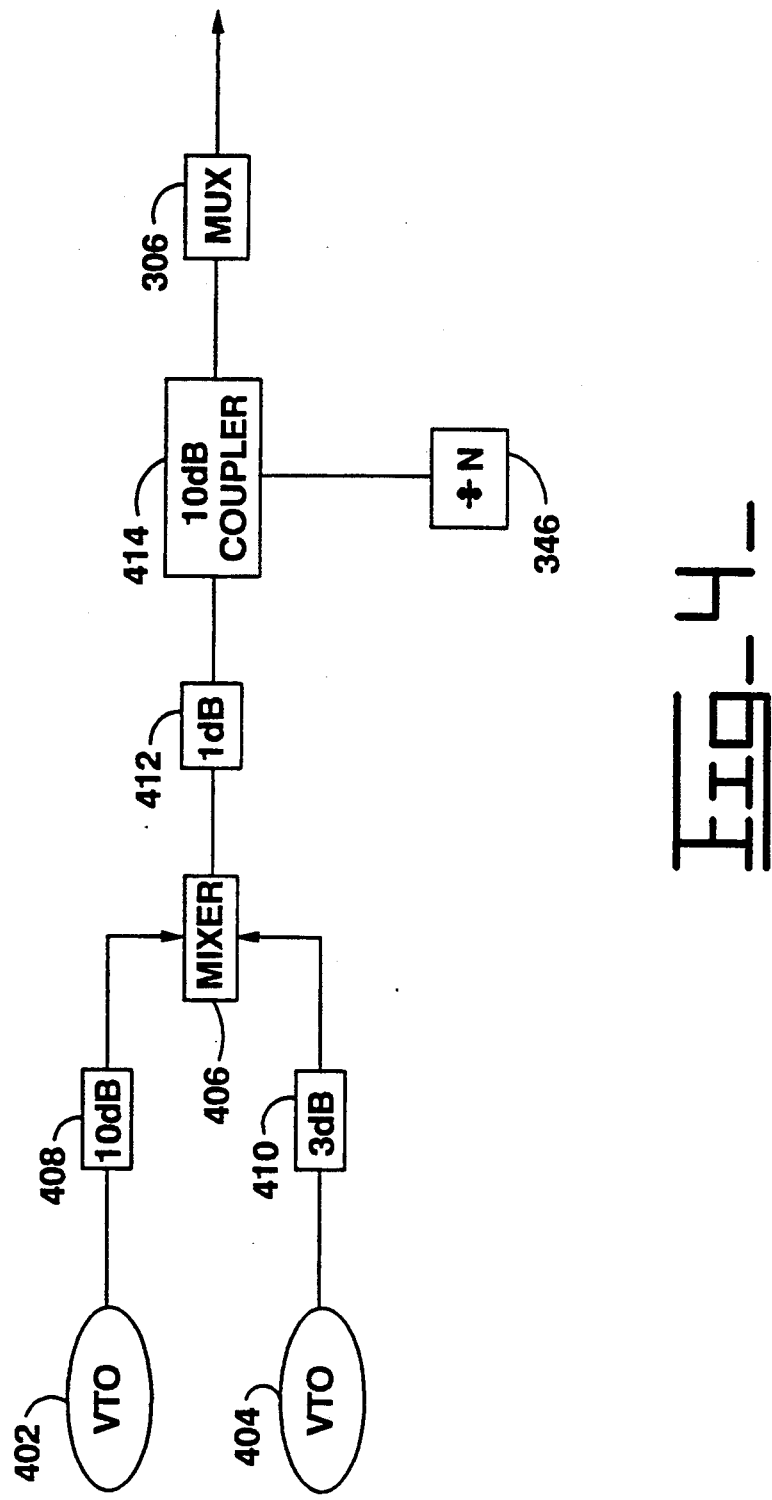
FIG. 4 illustrates a block diagram of the VCO portion of the transmitting section of the present invention.

With reference to the drawings, the multiplexed RF system 102 is adapted to determine the linear extension of a plurality of hydraulic cylinders 104,104' (shown here in FIG. 1 as blocks).

As shown in the stylized representation of the conventional hydraulic cylinder 104 in FIG. 2, each hydraulic cylinder 104,104' includes a piston 202 and piston rod 208 and a housing 206. The piston rod 204 has a total length $L_t$ and is moveable within the housing 206 to form a variable length coaxial resonant cavity 208.

The cavity length $L_c$ is equivalent to the total length $L_t$ minus the length $L_e$ of the extended portion of the rod 204 plus the thickness of the housing and end wall. Thus, by determining the cavity length $L_c$, the extended length $L_e$ can be directly derived and used as an indicator of the actual position of a work implement (not shown) attached to the piston rod 204.

The multiplexed RF system 102 detects the linear extension of a plurality of hydraulic cylinders 104 by selectively transmitting radio frequency (RF) signals into the coaxial cavity 208 through a transmitting antenna 210 and receiving reflections of the transmitted RF power through a receiving antenna 212.

The coaxial resonant cavity 208 of each hydraulic cylinder 104 appears fundamentally similar to a coaxial transmission line with shorted ends. The hydraulic cylinder 104 includes an electrically conductive ring (not shown) to provide electrical connection between the housing 206 and the piston rod 208. In the preferred embodiment, the ring is copper plated.

When excited by a radio frequency (RF) signal, the cavity 208 is a highly reactive load except at resonant frequencies. More specifically, if the length $L_c$ of the cavity 208 is an integer multiple of half the wave length of the signal delivered into the coaxial cavity 208, then some RF energy is coupled into the cavity 208 exciting a transverse electromagnetic (TEM) field which can be described as the superposition of two waves propagating along the coaxial cavity 208. The presence of this time varying electromagnetic field in the cavity 208 causes the receiving antenna 212 to detect a signal of the same frequency. Each integer multiple is known as a harmonic or resonant frequency.

In one embodiment of the present invention, only the first integer multiple or first harmonic is detected. In a second embodiment, subsequent harmonics are detected.

The resonant frequency of an ideal coaxial cavity is given by the equation:

$$f_{res} = \frac{n}{2}\left(\frac{c}{(E_r)^{\frac{1}{2}}} \cdot \frac{1}{L_c}\right)$$

$$(n = 1, 2, 3, \dots)$$

where, $C = 3 \times 10^{10}$ cm/s, $f_{res}$ is the excitation frequency, and $E_r$ is the relative permittivity of the fluid within a cavity. The first harmonic corresponds to $n=1$, the second harmonic corresponds to $n=2$, etc..

The resonant frequency of the coaxial cavity 208 of each hydraulic cylinder 104 differs from that of the ideal equation owing to deviations in the geometry of the cavity 208, and from the affect of the actual coupling structure. However, a one-to-one relationship exists between the actual resonant frequency of the cavity 208 and the length of the cylinder $L_c$, such that deviations from the ideal cavity may be accounted for by calibrating each hydraulic cylinder family type.

Referring again to FIG. 1, a transmitting section or transmitting means 106 generates an RF signal having a predetermined frequency varying between preselected minimum and maximum values.

Referring to FIG. 3, the transmitting means 106 includes a first digital-to-analog (D/A) 302 and a voltage controlled oscillator (VCO) 304 connected in series. In the preferred embodiment, a D/A from Analog Devices Inc of Norwood, MA, part no. ADDAC72,is used.

With reference to FIG. 4, the VCO 304 includes first and second voltage tuned oscillators (VTOs) 402,404. In the preferred embodiment, the first VTO 402 has a frequency range of 4.3 to 5.8 GHz and the second VTO is set at 5.85 GHz. Suitable VTOs are available from Avantek Inc of Hopkins, MN, part nos. VTO8430 and VTO8490. The first and second VTOs 402,404 feed into a mixer 406 via first and second attenuator pads 408 and 410. In the preferred embodiment, the first and second attenuator pads 408,410 are ten decibel (10 dB) and three decibel (3dB) 410 attenuator pads, respectively. Suitable pads are available from KDI Corp of New York, NY, part nos. PAM-10 and PAM-3. In the preferred embodiment, the mixer is a double balanced mixer having an intermediate frequency (IF) range of DC (0) to 2 GHz. A suitable mixer is available from Watkins-Johnson Co, as part no. WJMSH. A 1 dB attenuator pad 412 (part no. PAM-1) feeds the output of the mixer 406 into a 10 dB coupler 414. A suitable coupler is available from Mini-Circuits as part no. PDC105.

Referring again to FIG. 1, a multiplexing means 108 receives the RF signal and selectively delivers the RF signal into the coaxial resonant cavity 208 of one of the hydraulic cylinders 104,104' and receives a first electromagnetic wave signal from within the coaxial resonant cavity 208 of the one hydraulic cylinder 104.

In the preferred embodiment, the multiplexing means 108 includes first and second multiplexers 306,307. In the preferred embodiment, the first and second multiplexers 306,307 are devices available from Mini-Circuits of Brooklyn, New York, part no. TOSW425. The first multiplexer 306 is connected to the 1 dB coupler 414 of the voltage controlled oscillator 304 as shown in FIGS. 3 and 4.

A receiving means 110 compares the magnitude of the electromagnetic wave signal to a predetermined threshold and responsively produces a first resonant signal. The receiving means 110 includes an automatic gain means 308 for receiving the frequency signal and responsively determining an automatic gain signal. In the preferred embodiment, the automatic gain means 308 includes a memory means 310 and a second D/A converter 312 connected in series. The first memory means 310 includes at least one programmable read only memory (PROM) 311. In the preferred embodiment, the PROM 311 contains a number of tables containing a number of gain factors. The gain factor is dependent upon the frequency of the RF signal being transmitted and the cylinder. A suitable PROM is available from Advanced Micro Devices Inc of Sunnyvale, CA, part no. AM27S191.The number of PROMs used is a function of the number of hydraulic cylinders and the size of the tables stored in the PROMs. A suitable D/A is available from National Semiconductor Corp of Santa Clara, CA as part no. DAC0800.

An automatic gain circuit (AGC) 314 receives the output of the second digital-to-analog converter 312. A suitable AGC is available from Plessey North America Corp of Chicago, IL as part no. SL6140. A comparator 315 compares the output of the automatic gain circuit 314 and the threshold value.

An RF amplifier 316 receives the output of the second multiplexer 307 and amplifies the received RF power. In the preferred embodiment, the RF amplifier includes two amplifiers in series (part nos. A26 and A29 available from Watkins-Johnson Co of Palo Alto, CA).

An RF detector 318 of conventional design generates a negative voltage responsive to the received RF power. The RF detector used is available from Advanced Control Components Inc of Clinton, New Jersey, as part no. ACSN-2094N. The output of the RF detector 318 for a cylinder having a first harmonic frequency, $f_{o1}$ of 350 MHz and a second harmonic frequency, $f_{o2}$, of 700 MHz second is shown in FIG. 5.

An inverter 320 inverts the output signal of the RF detector 318. One suitable inverter a.is part no. LM741 available from Motorola Inc of Roselle, IL. The output of the inverter 320 is fed into the automatic gain circuit 314.

A controlling means 112 receives the resonant signal and responsively determines the linear extension of the hydraulic cylinders 104 as a function of the frequency of the transmitted RF signal. The controlling means 112 includes counting means 322 for generating a frequency signal having a predetermined magnitude which varies between minimum and maximum values. In the preferred embodiment, the counting means 322 includes a 16 bit digital counter 324. A suitable counter is available from Motorola Inc as part no. 74HC191.

The controlling means 112 further includes a processing unit 326 and a second memory means 328. In the preferred embodiment, the processing unit 326 is based on a MC68HC11 microprocessor available from Motorola Inc. The processing unit 326 is connected to the first digital counter 324 by first and second latches 330,332. Suitable latches are tri-state octal latches available from Motorola Inc, part no. 74HC573. In the preferred embodiment, the second memory means 328 includes a second PROM 329. A suitable PROM 329 is available from Advanced Micro Devices as part no. AM27C128. In the preferred embodiment, the second PROM 329 stores a number of lookup tables (one for each cylinder). Each lookup table is similar to the graph shown in FIG. 6. The graph of FIG. 6, illustrates the proportional relationship between the resonant frequency of the cylinder and the extended length, $L_e$ of the piston rod 204. As shown, at an extended length of zero, the resonant frequency of one hydraulic cylinder having a cavity length of approximately 24 inches, is approximately 200 MHz. The resonant frequency for a given extension is dependent upon the geometry of the cylinder. For example, another cylinder having a cavity length of approximately 70 inches may have a resonant frequency (at zero extension) down to 50 MHz.

The controlling means 112 further includes means for determining the threshold values. The threshold value determining means 334 includes a third memory means 336 and a third digital-to-analog converter 338 (part no. DAC0800) connected in series. In preferred embodiment, the third memory means 336 includes a third PROM 337 (part no. AM27128). In the preferred embodiment, the third PROM 337 contains number of tables storing the threshold values for each cylinder.

A third latch 340 (part no. 74HC573) connects the output of the comparator to second digital counter 342. A third digital counter 344 is connected to the second digital counter 342. The second digital counter 342 is connected to the voltage controlled oscillator 304 through a prescaler or divider 346. In the preferred embodiment, a 256 divider from Plessey North America, part no. SP4740 is used. The output of the second digital counter 342 is connected to the processing unit 326. The third digital counter 344 is connected to the processing unit 326 and the second memory means 328.

When the output of the AGC 314 exceeds the threshold value from the third PROM 337, the third latch enables the second digital counter 342. The second digital counter enables the third digital counter 344. The second digital counter 342 counts 128 pulses from the output of the divider 346 and the third digital counter 344 counts the time required for 128 pulses to occur. In the preferred embodiment, the third digital counter 344 uses a 16 MHz clock input.

A fourth latch 348 connects the processing unit 326 with the first and third PROMs 311,337 and the first and second multiplexers 306,307.

The control means 112 further includes a fourth memory means 350 used for temporary storage of data. In the preferred embodiment, the fourth memory means 350 includes a fourth PROM (part no. AM27C128).

FIGS. 7 to 10 are flowcharts illustrating a computer software program for implementing the preferred embodiment of the present invention. The program depicted in these flowcharts is particularly well adapted for use with the microcomputer and associated components described above, although any suitable microcomputer may be utilized in practicing an embodiment of the present invention. These flowcharts constitute a complete and workable design of the preferred software program, and have been reduced to practice on the MC68HC11 microcomputer system. The software program may be readily coded from these detailed flowcharts using the instruction set associated with this system, or may be coded with the instructions of any other suitable conventional microcomputer. The process of writing software code from flowcharts such as these is a mere mechanical step for one skilled in the art.

With reference to FIG. 7, the main control loop of the software program is described. In control block 702, a timer or watchdog timer is reset. The watchdog timer is of conventional design and is used to detect if the microprocessor has become disabled. The use of a watchdog timer is well known in the art and is therefore not further discussed.

In control block 704, the system 102 is initialized. The initialization routine includes initializing the hardware, as well as constants and other software parameters.

In control block 706, the subroutine GETCP is called. As explained below, the GETCP determines the linear extension or position of all of the hydraulic cylinders. The subroutine GETCP stores the cylinder positions in the second PROM 329.

In control block 708, the diagnostic subroutine DIAG is called.

In control block 710, the systems communications are serviced. This includes reading the positions from the second PROM 329, calculating a checksum (CHKSUM) for transmission purposes and transmitting the data outside the system.

In the preferred embodiment, cylinder positions are needed every 15 ms. Therefore, the time taken for control blocks 702–710 to be performed is determined and subtracted from 15 ms. In control block 712, the program then delays or waits for the remaining time to lapse. Control then returns to control block 702.

With reference to FIG. 8, the operation of subroutine GETCP is described. In the preferred embodiment, the processing unit 326 normally handles communications first. During the subroutine GETCP, however, this is undesirable. In control block 802, communication interrupts are therefore disabled.

In the preferred embodiment, the value in the first digital counter 324 is used to control the frequency of the output of the VCO 304. The value of the counter is inversely proportional to the frequency of the VCO output signal. In order to determine the extension of the cylinder to first counter 324 is first set to a high value and linearly decreased until a maximum frequency is reached or the extension is determined.

In control block 804, the ramp function is disabled. This ensures that the VCO 304 is turned off so that a random or undesired signal is not set to the multiplexing means 108 through the VCO 304.

In control block 806, the ramp function is reset. This is done by resetting the first digital counter 324. In one embodiment, this is done by setting the counter 324 to a maximum value (for example, $FFFF) through latch 332.

In another embodiment, the first counter 324 is set to a value dependent upon the last known position of the cylinder. For example, if the last known position of the cylinder was 10 cm with a corresponding frequency of 300 MHz, the counter 324 may be set to a value corresponding to a frequency of less than 300 MHz.

In control block 808, the program waits for a fixed time delay of 25 microseconds.

In control block 810, the next cylinder for which the position is to be determined is selected. The processing unit 326 sends a signal to the multiplexing means 108 through the fourth latch 348. The signal controls the first and second multiplexers 306,307 to transmit and receive to/from the corresponding cylinder.

In control block 812, the threshold and gain tables are selected. The threshold and gain tables are contained in the third and first memory means 336,310, respectively.

In control block 814, the subroutine GETDATA is called. GETDATA determines the position of the cylinder designated by X.

In control block 816, the position of cylinder X is stored in the second PROM 329.

In control block 818, if the end of the cycle has been reached, that is, the position of all the cylinders has been determined, control goes to control block 824.

In control block 824, communication interrupts are enabled. Control then returns to the MAIN control loop.

If the end of the cycle has not been reached, then X is incremented (control block 820) and control returns to control block 804.

With reference to FIG. 9A, one embodiment of subroutine GETDATA is described. In the preferred embodiment, a hardware interrupt line (ID) is set when the linear position of the cylinder (104) has been determined. Therefore at the start of GETDATA, the interrupt line is reset (control block 902). In control block 904, the second and third digital counters 342,344 are reset (to zero). In control block 906, the ramp function is started and a timer is started. That is, the first digital counter is linearly decreased resulting in an increasing frequency RF signal being generated.

In control blocks 908-912 a loop is executed until the position of the cylinder has been determined. In control block 908, the watch dog timer is reset. In control block 910, the elapsed time is compared with a maximum ramp time. If the elapsed time is less than the maximum ramp time than control goes to control block 912. In control block 912, if the hardware interrupt line ID is set than the position has been determined (see below) and control proceeds to control block 914. Otherwise control returns to control block 908.

In control block 914, the error flags are cleared and control returns to subroutine GETCP. In control block 916, an error flag is set indicating that no position was determined and control returns to subroutine GETCP.

In a second embodiment, of subroutine GETDATA, the system 102 is adapted to determine two subsequent resonant frequencies of each hydraulic cylinder 102. The first digital counter 324 ramps up until a resonant frequency is found. The first digital counter 324 is then locked at the current value. As described above, the second and third digital counters 342,344 are then enabled. The first digital counter counts 128 pulses from the output of the divider 346 and the third digital counter 344 is used to time the period of the 128 pulses. After 128 pulses the value of the third digital counter 344 is stored in the second PROM 329.

The first digital counter 324 is then started again from the current value and the next resonant frequency is found. The two resonant frequencies are then subtracted and the linear position of the current hydraulic cylinder 102 is determined as a function of the difference.

With reference to FIG. 9B, the software interrupt routine is described. When the interrupt line ID is set, the routine is run. First, in control block 918, the software clears the software interrupt flag. Then the cylinder position is read. This involves reading the value of cylinder extension from the second PROM 324. In the preferred embodiment, the value in the third digital counter 344 is an address of a memory location within the second PROM 324. The value of the third digital counter 344 is proportional to the resonant frequency. The counter value is then plugged into the corresponding lookup table in the second PROM 329 to determine the cylinder extension.

With reference to FIG. 10, the main control loop calls a diagnostic subroutine: DIAG. DIAG keeps track of the total number of errors (ERROR1) and looks for consecutive errors, both in position (ERROR3) and change in position or velocity (ERROR2).

In control block 1002, the POSITION or linear extension of cylinder X is read from the second PROM 329.

In control block 1004 POSITION is compared to a software set maximum position (MAX1). If POSITION>MAX1 then control goes to control block 1022. If POSITION<MAX1 then control goes to control block 1006.

In control block 1006 POSITION is compared to a software set minimum position (MIN1). If POSITION>MIN1 then control goes to control block 1022. If POSITION≦MIN1 then control goes to control block 1008. Since POSITION is within the acceptable boundaries set by MAX1 and MIN1, the ERROR1 FLAG is cleared in control block 1008.

In control block 1010, the previous cylinder position is read from the second PROM 329. In control block the previous cylinder position is subtracted from the current POSITION to determine a ΔPOSITION.

In control block 1014 ΔPOSITION is compared to a software set maximum position (MAX2). If ΔPOSITION>MAX2 then control goes to control block 1020. If ΔPOSITION≦MAX2 then control goes to control block 1016.

In control block 1016, POSITION is compared to a software set minimum position (MIN2). If ΔPOSI- TION>MIN2 then control goes to control block 1020. If ΔPOSITION≦MIN2 then control goes to control block 1018. Since ΔPOSITION is within the acceptable boundaries set by MAX2 and MIN2, the ERROR2 FLAG is cleared in control block 1008.

In control blocks 1020,1022 the ERROR2 and ERROR1 flags are incremented, respectively. The ERROR1 and ERROR2 flags keep track of the number of consecutive position and velocity errors, respectively.

In control block 1024, since the new position is out of acceptable bounds (position or velocity) the previous position is stored as the current position. In control block 1026, the ERROR3 flag is incremented. ERROR3 keeps track of the total number of errors, position or velocity.

In control clock 1028, if all the cylinder positions have been checked then control returns to the main control loop. Otherwise, X is incremented (control block 1030) and control returns to control block 1002.

INDUSTRIAL APPLICABILITY

With reference to the drawings and in operation, the multiplexed RF system 102 is adapted to determine the linear extensions of a plurality of hydraulic cylinders 104. For the purposes of discussion, the operation of the system 102 will be described with two cylinders 104,104'.

The system 102 cycles through main control loop every 15 ms and determines the linear position of each hydraulic cylinder. Then the system 102 supplies the position of each hydraulic cylinder every 15 ms to a separate external system (not shown). The external system may use this information for display purposes or in a control system which is adapted to control the movement of the hydraulic cylinders 104,104'. For example, the cylinders 104,104' may actuate the boom and stick of an earthmoving excavator's linkage. The position of each cylinder would be used to provide feedback to the control system.

Other aspects, objects, and advantages of the present invention can be obtained from a study of the drawings, the disclosure, and the appended claims.

I claim:

1. An apparatus for detecting the linear extensions of a plurality of hydraulic cylinders, each said hydraulic cylinder having a piston, a piston rod, and a housing and defining a variable length coaxial resonant cavity, the linear extension of each cylinder being defined by the relative position of each piston and piston rod relative to the corresponding housing, comprising:
   transmitting means for generating an RF signal having a predetermined frequency varying between preselected minimum and maximum values;
   multiplexing means for receiving said RF signal and selectively delivering said RF signal into the coaxial resonant cavity of one of said hydraulic cylinders and for receiving a first electromagnetic wave signal within said coaxial resonant cavity of said one of said hydraulic cylinders;
   receiving means for comparing the magnitude of said first electromagnetic wave signal to a first predetermined threshold value and responsively producing a first resonant signal; and
   controlling means for receiving said resonant signal and responsively determining the linear extension of said one hydraulic cylinder as a function of the frequency of said RF signal.

2. An apparatus, as set forth in claim 1, wherein said controlling means includes counting means for generating a frequency signal having a predetermined magnitude varying between minimum and maximum values and wherein said transmitting means includes means for receiving said frequency signal and wherein said predetermined frequency of said RF signal is proportional to the magnitude of said frequency signal.

3. An apparatus, as set forth in claim 2, wherein said controlling means includes means for resetting said counting means.

4. An apparatus, as set forth in claim 1, wherein said counting means linearly increases the magnitude of said frequency signal.

5. An apparatus, as set forth in claim 1, wherein said controlling means includes a processing unit and a first memory means.

6. An apparatus, as set forth in claim 2, said controlling means includes means for resetting said frequency signal and for producing an application signal and wherein said multiplexing means includes means for receiving said application signal and responsively delivering said RF signal into the coaxial resonant cavity of another of said hydraulic cylinders and for receiving a second electromagnetic wave signal within said coaxial resonant cavity of said another of said hydraulic cylinders.

7. An apparatus, as set forth in claim 6, wherein said receiving means includes means for comparing said second electromagnetic wave signal with a second predetermined threshold and responsively producing a second resonant signal and wherein said controlling means includes means for receiving said second resonant signal and responsively determining the linear extension of said another of said hydraulic cylinders as a function of the frequency of said RF signal.

8. An apparatus, as set forth in claim 7, including memory means for storing the linear extensions of said hydraulic cylinders.

9. An apparatus, as set forth in claim 8, wherein said stored extensions are proportional to the magnitude of said frequency signal.

10. An apparatus, as set forth in claim 9, wherein said controlling means resets said frequency signal as a function of the previous stored extension of said one hydraulic cylinder.

11. An apparatus, as set forth in claim 2, wherein said transmitting means includes a digital to analog converter and a voltage controlled oscillator connected in series.

12. An apparatus, as set forth in claim 2, wherein said receiving means includes an automatic gain means for receiving said frequency signal and responsively determining an automatic gain signal.

13. An apparatus, as set forth in claim 12, wherein said automatic gain means includes means for multiplying said first electromagnetic wave signal by said automatic gain signal.

14. An apparatus, as set forth in claim 13, wherein said automatic gain means includes second memory means.

15. An apparatus, as set forth in claim 14, wherein said second memory means is adapted to store a lookup table.

16. An apparatus, as set forth in claim 2, wherein said controlling means includes third memory means for storing a lookup up table, said third memory means being connected to said counting means and said lookup table consisting of a plurality of threshold values.

17. An apparatus, as set forth in claim 16, wherein said controlling means includes a comparator.

18. An apparatus, as set forth in claim 2, wherein said controlling means includes means for determining said threshold value.

19. An apparatus, as set forth in claim 18, wherein said threshold value is a function of said frequency signal.

20. An apparatus for detecting the linear extensions of a plurality of hydraulic cylinders, each said hydraulic cylinder having a piston, a piston rod, and a housing and defining a variable length coaxial resonant cavity, the linear extension of each cylinder being defined by the relative position of each piston and piston rod relative to the corresponding housing, comprising:
   counting means for generating a frequency signal having a predetermined magnitude varying between minimum and maximum values;
   transmitting means for receiving said frequency signal and responsively generating an RF signal having a predetermined frequency proportional to the magnitude of said frequency signal;
   multiplexing means for receiving said RF signal and selectively delivering said RF signal into the coaxial resonant cavity of one of said hydraulic cylinders and for receiving a first electromagnetic wave signal within said coaxial resonant cavity of said one of said hydraulic cylinders;
   receiving means for comparing the magnitude of said first electromagnetic wave signal to a first predetermined threshold and responsively producing a first resonant signal; and
   controlling means for receiving said resonant signal and responsively determining the linear extension of said one hydraulic cylinder as a function of the frequency of said RF signal.

21. A method for detecting the linear extensions of a plurality of hydraulic cylinders, each said hydraulic cylinder having a piston, a piston rod, and a housing and defining a variable length coaxial resonant cavity, the linear extension of each cylinder being defined by the relative position of each piston and piston rod relative to the corresponding housing, including the steps of:
   producing a cylinder signal indicative of a desired cylinder;
   generating an RF signal having a predetermined frequency varying between preselected minimum and maximum values;
   receiving said cylinder signal and responsively delivering said generated RF signal into the coaxial cavity of one of said hydraulic cylinders; and
   receiving electromagnetic wave signals from within said coaxial cavity of said one hydraulic cylinder and responsively determining the linear position of said one hydraulic cylinder.

22. A method for detecting the linear extensions of a plurality of hydraulic cylinders, each said hydraulic cylinder having a piston, a piston rod, and a housing and defining a variable length coaxial resonant cavity, the linear extension of each cylinder being defined by the relative position of each piston and piston rod relative to the corresponding housing, including the steps of:
   producing a cylinder signal indicative of a desired cylinder position;
   generating an RF signal having a predetermined frequency varying between preselected minimum and maximum values;
   receiving said cylinder signal and responsively delivering said generated RF signal into the coaxial cavity of one of said hydraulic cylinders;
   receiving electromagnetic wave signals from within said coaxial cavity and responsively determining the linear position of said hydraulic cylinder;
   producing a second cylinder signal indicative of a second desired cylinder position;
   generating a second RF signal having a predetermined frequency varying between preselected minimum and maximum values;
   receiving said second cylinder signal and responsively delivering said generated RF signal into the coaxial cavity of another of said hydraulic cylinders; and
   receiving electromagnetic wave signals from within said coaxial cavity of another of said hydraulic cylinders and responsively determining the linear position of said another of said hydraulic cylinders.

23. A method, as set forth in claim 22, wherein the steps of determining the linear position of said hydraulic cylinders includes the steps of determining a resonant frequency of said hydraulic cylinder and determining the linear position of said hydraulic cylinder as a function of said resonant frequency.

24. A method, as set forth in claim 22, wherein the steps of determining the linear position of said hydraulic cylinders includes the steps of determining two resonant frequencies of said hydraulic cylinder and determining the linear position of said hydraulic cylinder as a function of said resonant frequencies.

* * * * *